(12) United States Patent
Liu

(10) Patent No.: US 7,254,891 B2
(45) Date of Patent: Aug. 14, 2007

(54) LAWN CUTTING DEVICE

(76) Inventor: Chang-Shin Liu, No. 36, Lane 938, Min-Sheng S. Rd., Chia-Yi City (TW)

( * ) Notice: Subject to any disclaimer, the term of this patent is extended or adjusted under 35 U.S.C. 154(b) by 35 days.

(21) Appl. No.: 11/138,370

(22) Filed: May 27, 2005

(65) Prior Publication Data

US 2006/0265882 A1   Nov. 30, 2006

(51) Int. Cl.
*B26B 7/00*   (2006.01)
(52) U.S. Cl. .......................... 30/276; 30/272.1; 30/342; 30/388; 83/666; 83/676; 83/698.41
(58) Field of Classification Search .................. 30/276, 30/263, 264, 266, 270, 272.1, 277, 340, 342, 30/388, 337; 83/666, 676, 698.41; 451/342, 451/359
See application file for complete search history.

(56) References Cited

U.S. PATENT DOCUMENTS 2,697,457 A * 12/1954 Lawrence ................... 30/388
4,310,970 A * 1/1982 Evenson et al. .............. 30/276
5,239,755 A * 8/1993 Kramer ....................... 30/264
6,751,871 B2 * 6/2004 Furnish ...................... 30/276
6,813,837 B1 * 11/2004 Chen ......................... 30/272.1

* cited by examiner

*Primary Examiner*—Boyer D. Ashley
*Assistant Examiner*—Omar Flores Sánchez
(74) *Attorney, Agent, or Firm*—Pearl Cohen Zedek Latzer LLP

(57) ABSTRACT

A lawn cutting device includes a handle having a hollow connecting part that has a bottom end portion defining a bottom opening and a driving member having an output shaft that is received in the connecting part of the handle and that extends outwardly through the bottom opening. The device also includes a blade-mounting seat spaced apart from the bottom end portion of the connecting part of the handle, and aligned coaxially with and secured to the output shaft. The device further includes a blade member mounted on the blade-mounting seat; and a protecting member including a cup-shaped body that is coaxially aligned with and that extends from the blade-mounting seat, and that defines a recess which receives the bottom end portion of the connecting part of the handle therein.

1 Claim, 5 Drawing Sheets

LAWN CUTTING DEVICE

BACKGROUND OF THE INVENTION

1. Field of the Invention

This invention relates to a lawn cutting device, more particularly to a lawn cutting device with a protecting member capable of preventing foreign substances, such as cut weeds and dirt, from entering a driving member.

2. Description of the Related Art

FIG. 1 illustrates a conventional lawn cutting device that includes a handle with a connecting part 11 defining a bottom recess 111, a driving member 12 with an output shaft 121 extending through the bottom recess 111, a blade-mounting seat 15 extending into the bottom recess 111 and secured to the output shaft 121, a blade member 13 mounted on the blade-mounting seat 15, and a protecting shield 14 extending from the connecting part 11 to surround a portion of the blade member 13.

The conventional lawn cutting device is disadvantageous in that foreign substances, such as cut weeds and dirt, tend to enter the bottom recess 111 in the connecting part 11 of the handle, which may cause problems, such as undesired shutdown during operation due to clogging of the cut weeds and dirt in a clearance surrounding the output shaft 121, frequent cleaning and maintenance, and even damage to the driving member 12, thereby reducing the service life of the lawn cutting device.

SUMMARY OF THE INVENTION

The object of the present invention is to provide a lawn cutting device that is capable of overcoming the aforesaid drawbacks of the prior art.

Accordingly, there is provided a lawn cutting device that comprises: a handle having a hollow connecting part that has a bottom end portion defining a bottom opening; a driving member having an output shaft that is received in the connecting part of the handle and that extends outwardly through the bottom opening; a blade-mounting seat spaced apart from the bottom end portion of the connecting part of the handle, and aligned coaxially with and secured to the output shaft; a blade member mounted on the blade-mounting seat; and a protecting member including a cup-shaped body that is coaxially aligned with and that extends from the blade-mounting seat, and that defines a recess which receives the bottom end portion of the connecting part of the handle therein.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
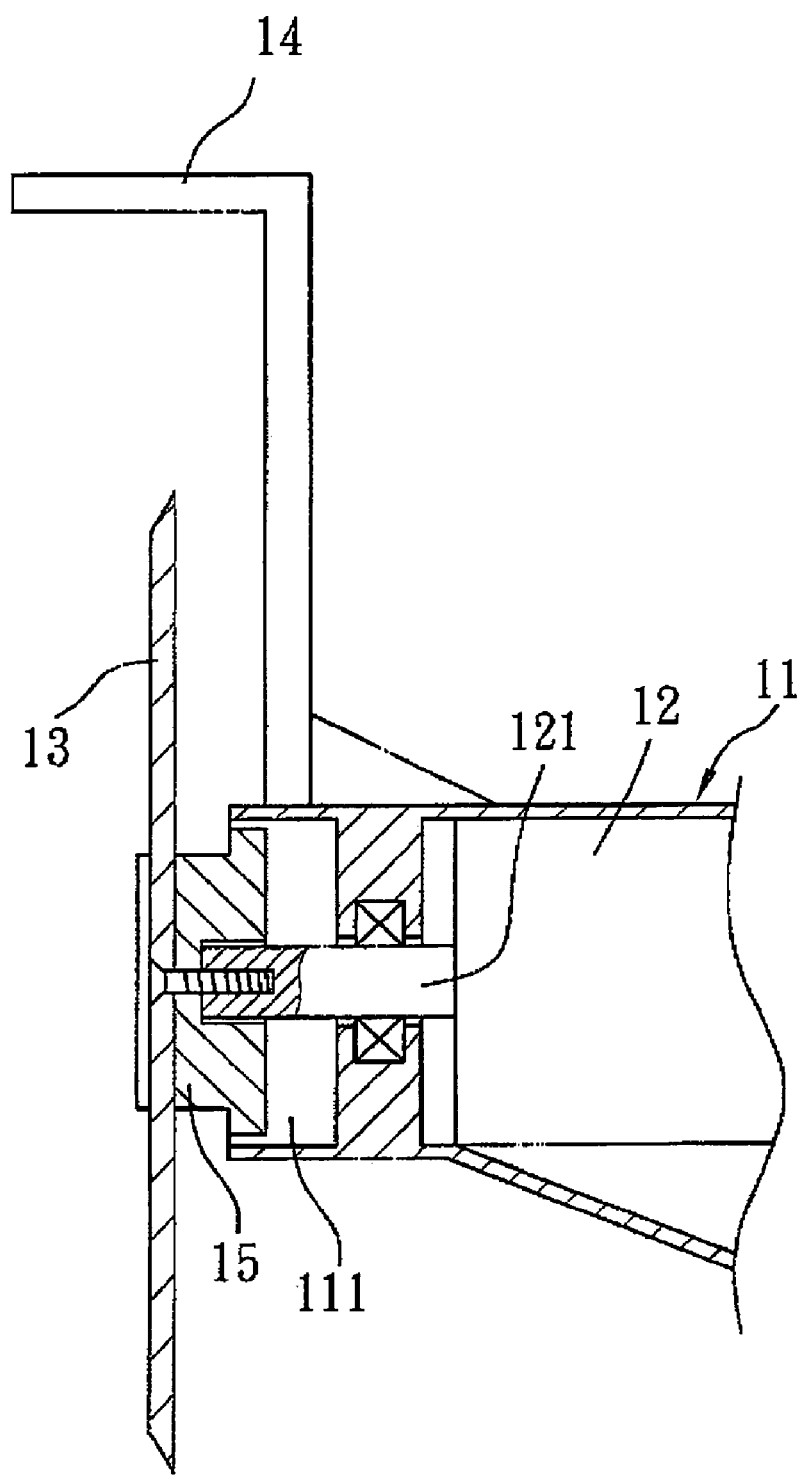
FIG. 1 is a fragmentary sectional view of a conventional lawn cutting device.

Before the present invention is described in greater detail, it should be noted that same reference numerals have been used to denote like elements throughout the specification.

Figure 2:
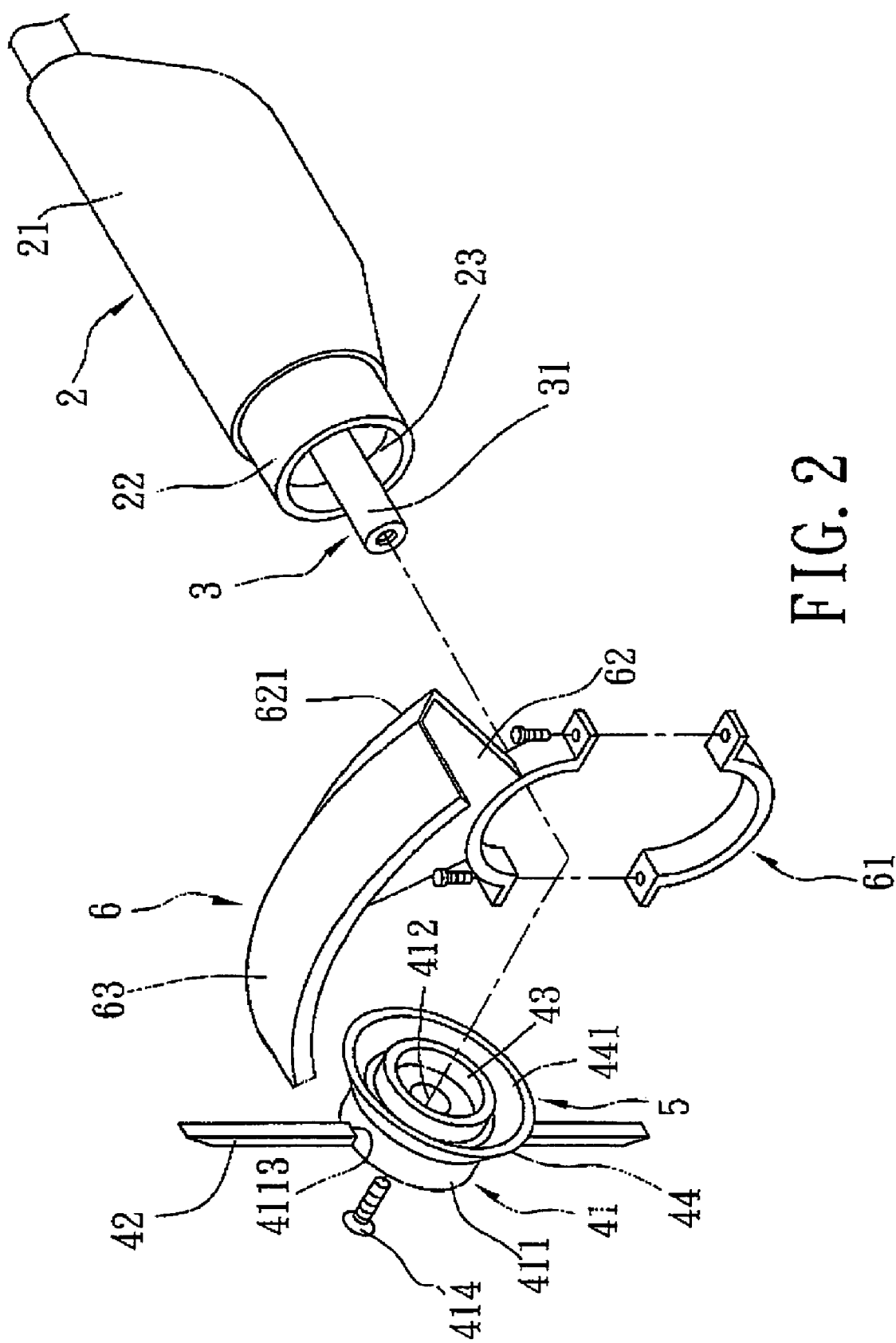
FIG. 2 is a fragmentary exploded perspective view of the first preferred embodiment of a lawn cutting device according to this invention.
Figure 3:
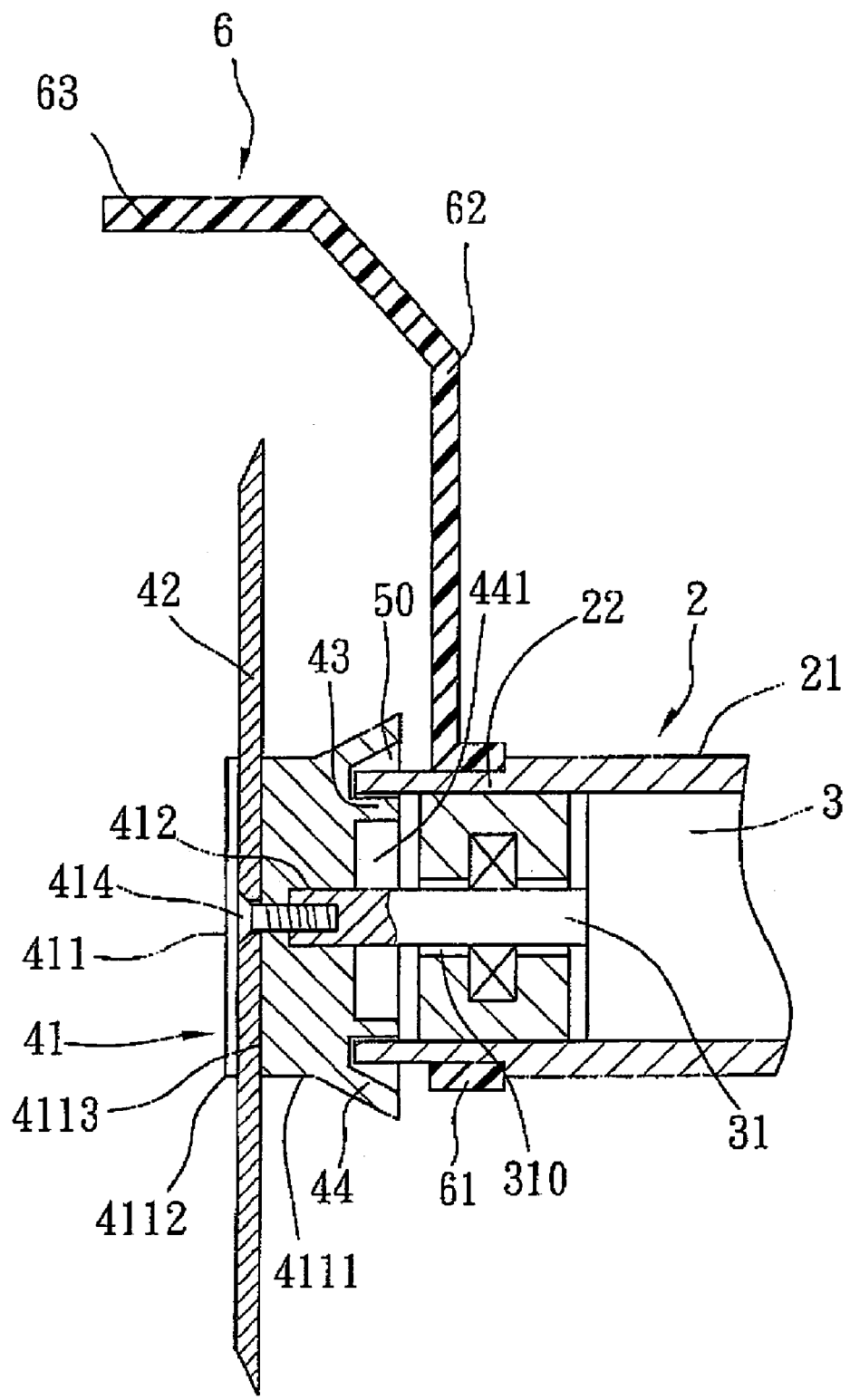
FIG. 3 is a fragmentary sectional view of the first preferred embodiment.

FIGS. 2 and 3 illustrate the first preferred embodiment of a lawn cutting device according to the present invention, which includes: an elongated handle 2 having a hollow connecting part 21 that has a bottom end portion 22 defining a bottom opening 23; a driving member 3, such as a motor, having an output shaft 31 that is received in the connecting part 21 of the handle 2 and that extends outwardly through the bottom opening 23; a blade-mounting seat 41 spaced apart from the bottom end portion 22 of the connecting part 21 of the handle 2, and aligned coaxially with and secured to the output shaft 31; a blade member 42 mounted on the blade mounting seat 41; and a protecting member 5 including a cup-shaped body 44 that is coaxially aligned with and that extends from the blade-mounting seat 41, and that defines a recess 441 which receives the bottom end portion 22 of the connecting part 21 of the handle 2 therein so as to prevent foreign substances, such as cut weeds and dirt, from entering a clearance 310 (see FIG. 3) around the output shaft 31 of the driving member 3.

In this embodiment, the connecting part 21 of the handle 2 is cylindrical in shape. The cup-shaped body 44 diverges from the blade-mounting seat 41 toward the connecting part 21 of the handle 2. The protecting member 5 further includes an annular wall 43 that is coaxially aligned with and that extends from the blade-mounting seat 41 into the recess 441, and that cooperates with the cup-shaped body 44 to define a gap 50 therebetween. The bottom end portion 22 of the connecting part 21 of the handle 2 extends into the gap 50.

The blade-mounting seat 41 includes a cylindrical body 411 having top and bottom ends 4111, 4112. The cup-shaped body 44 extends from the top end 4111 of the cylindrical body 411 toward the connecting part 21 of the handle 2. The bottom end 4112 of the cylindrical body 411 is formed with a radially extending groove 4113. The blade member 42 is fittingly received in the radially extending groove 4113 in the bottom end 4112 of the cylindrical body 411.

In this embodiment, the cylindrical body 411 of the blade-mounting seat 41, the cup-shaped body 44 and the annular wall 43 are integrally formed as one single piece.

The cylindrical body 411 is formed with an axially extending hole 412. The output shaft 31 extends into the axially extending hole 412. A screw fastener 414 extends through the blade member 42 into the axially extending hole 412, and threadedly engages the output shaft 31 so as to fasten the blade-mounting seat 41 and the blade member 42 to the output shaft 31.

A protecting shield 6 includes a sleeve 61 that is sleeved on the connecting part 21, a sector-shaped plate 62 that extends radially from the sleeve 61 and that has a surrounding edge 621, and a surrounding wall 63 that extends from the surrounding edge 621 of the sector-shaped plate 62 so as to surround a rear side of the blade member 42, thereby blocking rearward flying movement of the cut weeds and protecting the user from being hurt by flying particles during cutting operation.

Figure 4:
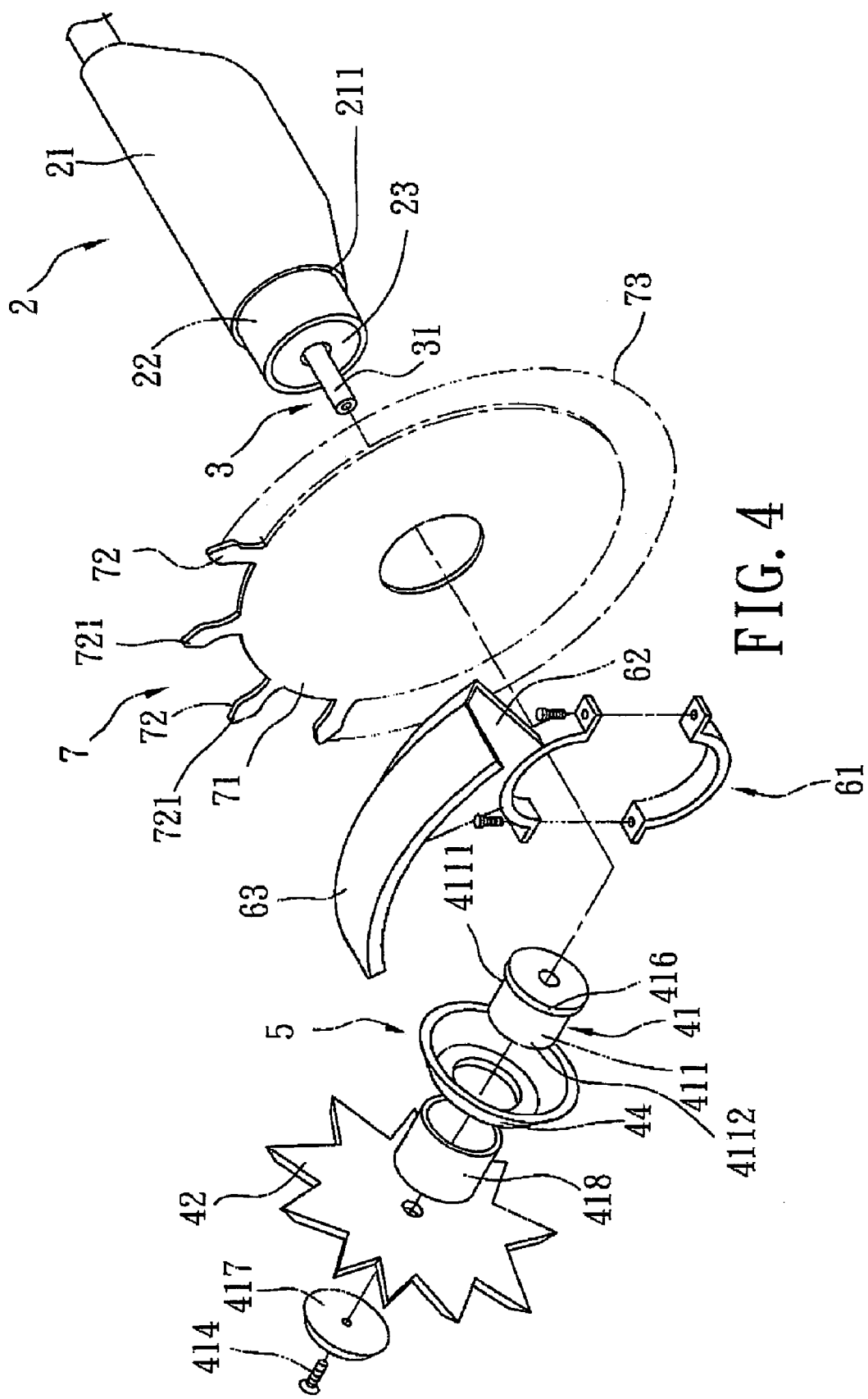
FIG. 4 is a fragmentary exploded perspective view of the second preferred embodiment of a lawn cutting device according to this invention.
Figure 5:
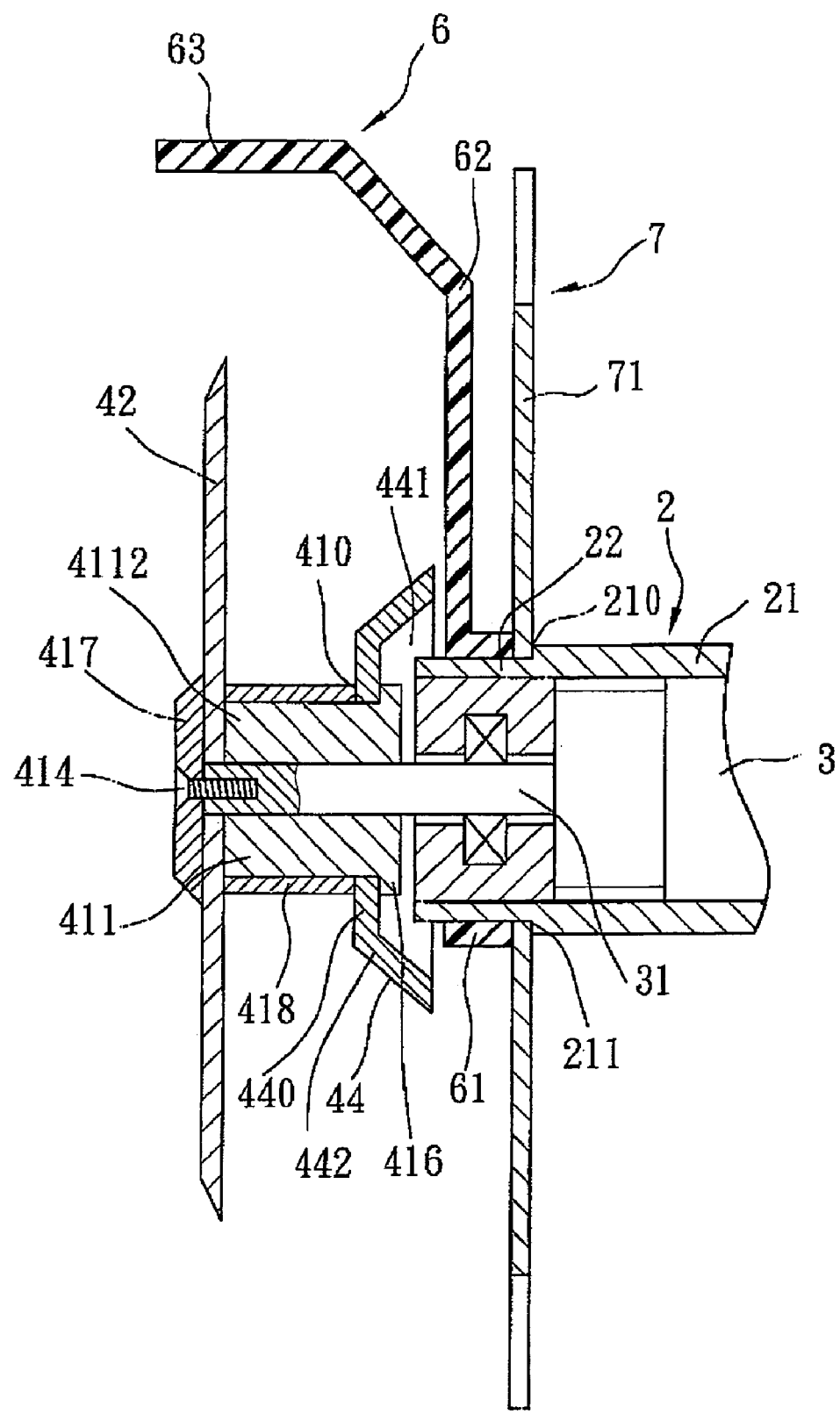
FIG. 5 is a fragmentary sectional view of the second preferred embodiment.

FIGS. 4 and 5 illustrate the second preferred embodiment of the lawn cutting device according to this invention. The lawn cutting device of this embodiment differs from the previous embodiment in that the blade-mounting seat 41 includes a cylindrical body 411 which has top and bottom ends 4111, 4112 and which is formed with a flange 416 extending radially from the top end 4111 of the cylindrical body 412, and a sleeve 418 which extends between the top and bottom ends 4111, 4112 of the cylindrical body 411, which is sleeved on the cylindrical body 411, and which cooperates with the flange 416 to define a gap 410 therebetween. The cup-shaped body 44 of the protecting member 5 has a base portion 440 that extends fittingly into the gap 410 between the flange 416 and the sleeve 418, and a truncated-conical portion 442 that diverges from the base portion 440 and that defines the recess 441. The blade-mounting seat 41 further includes a fastening plate 417 that is spaced apart from the bottom end 4112 of the cylindrical body 411 and that is fastened to the output shaft 31 for sandwiching the blade member 42 between the fastening plate 417 and the bottom end 4112 of the cylindrical body 411. The sleeve 418 is sandwiched between the blade member 42 and the base portion 440 of the cup-shaped body 44 upon fastening of the fastening plate 417 to the output shaft 31.

In this embodiment, the connecting part 21 of the handle 2 is formed with an annular shoulder 211 that cooperates with the sleeve 61 of the protecting shield 6 to define a gap 210 therebetween. The lawn cutting device of this embodiment further includes a stopper 7 that includes an annular plate 71 extending fittingly into the gap 210 between the sleeve 61 of the protecting shield 6 and the shoulder 211 of the connecting part 21 and formed with a plurality of angularly displaced fingers 72. The fingers 72 have tips 721 that cooperatively define a circle 73 (see FIG. 4) having a diameter greater than that of the blade member 42 so as to prevent the blade member 42 from undesirably contacting relatively hard objects, such as rocks, stems of plants, and trunks of trees.

With the inclusion of the protecting member 5 in the lawn cutting device of this invention, the aforesaid drawbacks associated with the prior art can be eliminated.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A lawn cutting device comprising:

a handle having a hollow connecting part that has a bottom end portion defining a bottom opening;

a driving member having an output shaft that is received in said connecting part of said handle and that extends outwardly through said bottom opening;

a blade-mounting seat spaced apart from said bottom end portion of said connecting part of said handle, and aligned coaxially with and secured to said output shaft, said blade-mounting seat including a cylindrical body that has top and bottom ends and that is formed with a flange extending radially from said top end of said cylindrical body, and including a sleeve that extends between said top and bottom ends of said cylindrical body, that is sleeved on said cylindrical body, and that cooperates with said flange to define a gap therebetween;

a blade member mounted on said blade-mounting seat; and a protecting member including a cup-shaped body that is coaxially aligned with and that extends from said blade-mounting seat, and that defines a recess which receives said bottom end portion of said connecting part of said handle therein, said cup-shaped body having a base portion that extends fittingly into said gap between said flange and said sleeve, and a truncated-conical portion that diverges from said base portion and that defines said recess, said blade-mounting seat further including a fastening plate that is spaced apart from said bottom end of said cylindrical body and that is fastened to said output shaft for sandwiching said blade member between said fastening plate and said bottom end of said cylindrical body, said sleeve being sandwiched between said blade member and said base portion of said cup-shaped body upon fastening of said fastening plate to said output shaft.

* * * * *